United States Patent
Herve et al.

(10) Patent No.: US 8,454,866 B2
(45) Date of Patent: *Jun. 4, 2013

(54) PROCESS FOR THE PREPARATION OF PARTICLES BASED ON A THERMOPLASTIC POLYMER AND POWDER THUS OBTAINED

(75) Inventors: Pascal Herve, Lyons (FR); Christophe Paulo, Lyons (FR); Eric Roche, Luzinay (FR); Mare Labeille, Vourles (FR); Franck Touraud, Vernon (FR)

(73) Assignee: Rhodia Chimie, Aubervilliers (FR)

( * ) Notice: Subject to any disclaimer, the term of this patent is extended or adjusted under 35 U.S.C. 154(b) by 323 days.

This patent is subject to a terminal disclaimer.

(21) Appl. No.: 11/664,915

(22) PCT Filed: Oct. 6, 2005

(86) PCT No.: PCT/FR2005/002462

§ 371 (c)(1),
(2), (4) Date: Nov. 20, 2008

(87) PCT Pub. No.: WO2006/040443

PCT Pub. Date: Apr. 20, 2006

(65) Prior Publication Data

US 2009/0072424 A1    Mar. 19, 2009

(30) Foreign Application Priority Data

Oct. 8, 2004   (FR) ..................... 04 10628

(51) Int. Cl.
*B29B 9/00*   (2006.01)
*B28B 3/20*   (2006.01)
*B29C 47/00*   (2006.01)
*B32B 5/16*   (2006.01)

(52) U.S. Cl.
USPC ............ 264/9; 264/5; 264/7; 264/13; 264/14; 264/176.1; 264/178 R; 264/180; 425/402; 425/403; 425/407

(58) Field of Classification Search
USPC .................. 264/5, 9, 13, 14, 7, 176.1, 178 R, 264/180; 428/402, 403, 407
See application file for complete search history.

(56) References Cited

U.S. PATENT DOCUMENTS

| | | | | |
|---|---|---|---|---|
| 3,446,782 A | * | 5/1969 | Nakasatomi et al. | 528/323 |
| 3,449,291 A | * | 6/1969 | Bartsch et al. | 524/562 |
| 3,586,654 A | * | 6/1971 | Bartsch et al. | 430/137.18 |
| 3,674,736 A | * | 7/1972 | Lerman et al. | 523/307 |

(Continued)

FOREIGN PATENT DOCUMENTS

| | | |
|---|---|---|
| FR | 2 743 077 A1 | 7/1997 |
| FR | 2 793 252 A1 | 11/2000 |

(Continued)

OTHER PUBLICATIONS

International Search Report dated Mar. 8, 2006.

*Primary Examiner* — Christina Johnson
*Assistant Examiner* — Atul P. Khare
(74) *Attorney, Agent, or Firm* — Dentons US LLP

(57) ABSTRACT

The invention relates to a process for the preparation of particles based on a thermoplastic polymer with a mean diameter of less than 1 mm. The process of the invention comprises more particularly a stage of preparation of a composition comprising the thermoplastic polymer and an additive, in the molten state, of cooling the composition and of disintegration of the thermoplastic polymer dispersion.

26 Claims, 1 Drawing Sheet

U.S. PATENT DOCUMENTS

| | | | | |
|---|---|---|---|---|
| 4,104,453 A | * | 8/1978 | Broering et al. | 525/62 |
| 4,252,969 A | * | 2/1981 | Broering et al. | 528/492 |
| 4,254,207 A | * | 3/1981 | Landoll et al. | 430/137.19 |
| 4,329,304 A | * | 5/1982 | McClain | 264/8 |
| 6,160,080 A | | 12/2000 | Cucinella et al. | |
| 6,872,800 B1 | * | 3/2005 | Bouquerel et al. | 528/310 |
| 7,740,938 B2 | * | 6/2010 | Helft et al. | 428/402 |
| 2004/0242788 A1 | * | 12/2004 | La Grande et al. | 525/242 |
| 2005/0222376 A1 | * | 10/2005 | Sassi et al. | 528/310 |
| 2011/0293918 A1 | * | 12/2011 | Lucas et al. | 428/316.6 |

FOREIGN PATENT DOCUMENTS

| | | | |
|---|---|---|---|
| JP | 07 047545 A | | 2/1995 |
| JP | 2001 114901 A | | 4/2001 |
| JP | 2001114901 A | * | 4/2001 |
| WO | WO 94/06059 | | 3/1994 |
| WO | WO 9406059 A1 | * | 3/1994 |
| WO | WO 03002668 A1 | * | 1/2003 |
| WO | WO 03/051993 A1 | | 6/2003 |
| WO | WO 03051993 A1 | * | 6/2003 |

\* cited by examiner

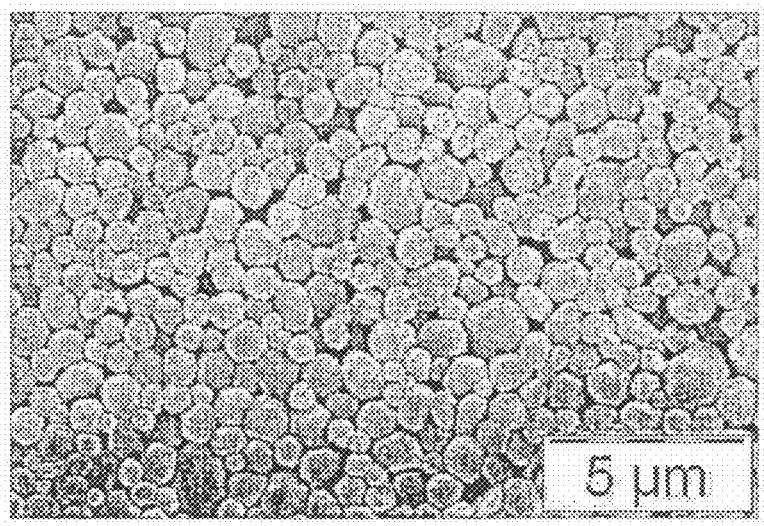

PROCESS FOR THE PREPARATION OF PARTICLES BASED ON A THERMOPLASTIC POLYMER AND POWDER THUS OBTAINED

This application is an application under 35 U.S.C. Section 371 of International Application Number PCT/FR2005/002462 filed on Oct. 6, 2005.

The invention relates to a process for the preparation of a powder composed of particles based on a thermoplastic polymer. The process of the invention comprises more particularly stages of preparation of a blend comprising the thermoplastic polymer and an additive in the molten state, of cooling the blend and of recovering the powder by disintegration. It also relates to the powder capable of being obtained by the process of the invention.

Thermoplastic polymers in the powder form, in particular in the form of spherical particles with a diameter generally of less than 1 mm, preferably of less than 100 μm, are advantageous in numerous applications. Specifically, thermoplastic polymer powders, such as polyamide powders, are used in particular as additive in paints, for example in paints for coating the floors of sports halls which have to have nonslip properties. Thermoplastic polymer powders are also introduced into cosmetic products, such as sun creams, creams for caring for the body or face, and make-up-removing products. They are also used in the field of inks and paper.

Various processes for obtaining thermoplastic polymer powders are known to a person skilled in the art.

Thermoplastic polymer powders can be obtained, for example, by milling or cryogenically milling thermoplastic polymer granules with an initial mean diameter of the order of 3 mm. Nevertheless, these mechanical conversions by size reduction often result in particles of irregular shape and with a size rarely of less than 100 μm. The size distribution of these particles is often broad and the latter can be employed with difficulty on the industrial scale.

It is also known to prepare thermoplastic polymer powders by dissolution of the polymer in a solvent and then precipitation. As the solvents for polymers, such as polyamide, for example, are highly corrosive and volatile, the safety conditions are strict and this process cannot be employed on an industrial scale. Furthermore, it is difficult, according to this process, to control the shape of the particles, which can be harmful for certain applications.

Other processes exist according to which the thermoplastic polymer powders are prepared in situ during the polymerization of the monomers of the polymer.

For example, it is known to obtain polymer powders, such as polyamide powders, by anionic polymerization of lactams in solution. The polymerization is carried out in the presence of the monomers, of a solvent for the monomers, of an initiator, of a catalyst and of an activator and the polymerization is carried out with stirring at a temperature in the region of 110° C. This process is specific to the polyamides obtained from monomers of lactam type. It is not very flexible and does not make it possible to vary the nature of the powders according to the final properties desired for the powder, for example by varying the nature of the monomers. It is also known to obtain copolyesteramide powders by anionic polymerization of lactams and lactones. These processes, by the anionic polymerization route, are difficult to control, in particular due to the high reactivity of the anionic route.

One of the aims of the invention is to provide a process for the manufacture of a thermoplastic material powder comprising particles having small dimensions with a narrow particle size distribution and with a substantially uniform shape.

To this end, the invention provides a process for the manufacture of a thermoplastic material powder comprising particles with a mean diameter of less than 1 mm, characterized in that it consists in:

a. forming a melt blend of the said thermoplastic material P with a compound or additive A composed of a polymeric material comprising at least a part of its structure compatible with the said thermoplastic material and at least part of its structure incompatible with and insoluble in the said thermoplastic material, in order to obtain a dispersion of discrete particles of the thermoplastic material P, b. cooling the said blend to a temperature below the softening temperature of the thermoplastic material, c. treating the said cooled blend in order to bring about the disintegration of the discrete particles of thermoplastic material.

According to another characteristic of the invention, the blend is formed by melting the thermoplastic material and adding the compound A in the solid or molten form and applying mixing energy, in order to bring about the formation of the discrete particles of thermoplastic material dispersed in an advantageously continuous phase formed by the compound A.

This blend can be obtained, in another embodiment of the invention, by blending, in the solid state, particles of the said thermoplastic material P and particles of the said additive A and melting the blend of particles with application to the melt blend of mixing energy, in order to bring about the formation of discrete particles of thermoplastic material P dispersed in an advantageously continuous phase formed by the compound A.

According to yet another characteristic of the invention, the concentration by weight of additive A in the blend is between 1% and 50%, advantageously between 3% and 30%.

More generally, the blend can be obtained with any suitable device, such as endless screw mixers or stirrer mixers, compatible with the temperature and pressure conditions used for the processing of the thermoplastic materials.

According to a preferred embodiment of the invention, the melt blend is formed before the cooling stage, for example in the form of filaments or laces. This forming can advantageously be carried out by a process of extrusion through a die.

According to a preferred embodiment of the invention, in particular when the melt blend is formed, this melt blend is preferably prepared in an extruder feeding the extrusion die.

The melt blend can be cooled by any appropriate means. Among these, air cooling or quenching in a liquid are preferred.

The stage of recovery of the thermoplastic material powder advantageously consists of a treatment for disintegration of the discrete particles of thermoplastic material. This disintegration can be brought about by application of a shear force to the cooled blend.

According to another embodiment of the invention, the disintegration of the particles made of thermoplastic material is brought about by quenching the cooled melt blend in a liquid which is not a solvent for the thermoplastic material and which is advantageously a solvent for the additive A.

The process of the invention makes it possible to obtain a thermoplastic material powder comprising particles of regular or irregular polyhedral shape. These particles, constituting the thermoplastic material powder, have a pore volume equal to or in the region of 0 cm$^3$/g as these particles do not exhibit any porosity.

The process of the invention makes it possible to manufacture particles from any thermoplastic material.

Mention may be made, as examples of thermoplastic polymers, of polyamides, polyesters, polyurethanes, polyolefins, such as polyethylene or polypropylene, polystyrene, and the like.

According to a specific embodiment of the process of the invention, the preferred thermoplastic polymers are polyamides.

Any polyamide known to a person skilled in the art can be used in the context of the invention. The polyamide is generally a polyamide of the type of those obtained by polycondensation starting from dicarboxylic acids and diamines or of the type of those obtained by polycondensation of lactams and/or amino acids. The polyamide of the invention can be a blend of polyamides of different types and/or of the same type and/or of copolymers obtained starting from different monomers corresponding to the same type and/or to different types of polyamide.

Mention may be made, as examples of polyamides which may be suitable for the invention, of polyamide 6, polyamide 6,6, polyamide 11, polyamide 12, polyamide 4,6, polyamide 6,10, polyamide 6,12, polyamide 12,12, polyamide 6,36, semiaromatic polyamides, for example the polyphthalamides obtained from terephthalic and/or isophthalic acid, such as the polyamide sold under the trade name Amodel, their copolymers and their alloys.

According to a preferred embodiment of the invention, the polyamide is chosen from polyamide 6, polyamide 6,6, their blends and their copolymers.

According to a specific embodiment of the invention, the thermoplastic polymer is a polymer comprising star macromolecular chains. The polymers comprising such star macromolecular chains are, for example, disclosed in the documents FR 2 743 077, FR 2 779 730, U.S. Pat. No. 5,959,069, EP 0 632 703, EP 0 682 057 and EP 0 832 149. These compounds are known for exhibiting an improved flowability with respect to linear polyamides with the same molecular mass.

According to another specific embodiment of the invention, the thermoplastic polymer is a polycondensate composed of:

30 to 100 mol % (limits included) of macromolecular chains corresponding to the following formula (I):

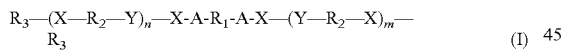

(I)

0 to 70 mol % (limits included) of macromolecular chains corresponding to the following formula (II):

(II)

in which
—X—Y— is a radical resulting from the polycondensation of two reactive functional groups $F_1$ and $F_2$ such that
$F_1$ is the precursor of the —X— radical and $F_2$ is the precursor of the —Y— radical, or vice versa,
the $F_1$ functional groups cannot react with one another by condensation,
the $F_2$ functional groups cannot react with one another by condensation,
A is a covalent bond or an aliphatic hydrocarbon radical which can comprise heteroatoms and which comprises from 1 to 20 carbon atoms,
$R_2$ is a branched or unbranched aliphatic or aromatic hydrocarbon radical comprising from 2 to 20 carbon atoms,
$R_3$ and $R_4$ represent hydrogen, a hydroxyl radical or a hydrocarbon radical, $R_1$ is a linear or cyclic, aromatic or aliphatic, hydrocarbon radical which comprises at least two carbon atoms and which can comprise heteroatoms,
n, m and p each represent a number between 50 and 500, preferably between 100 and 400.

Such a polycondensate is disclosed in Application WO 05/019510, incorporated by reference. The polycondensate is advantageously a polyamide composed of:

30 to 100 mol % (limits included) of macromolecular chains corresponding to the following formula (I):

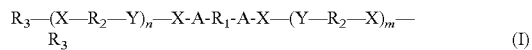

(I)

0 to 70 mol % (limits included) of macromolecular chains corresponding to the following formula (II):

(II)

in which:
Y is the

radical when X represents the

radical,
Y is the

radical when X represents the

radical,
A is a covalent bond or an aliphatic hydrocarbon radical which can comprise heteroatoms and which comprises from 1 to 20 carbon atoms,
$R_2$ is a branched or unbranched aliphatic or aromatic hydrocarbon radical comprising from 2 to 20 carbon atoms,
$R_3$ and $R_4$ represent hydrogen, a hydroxyl radical or a hydrocarbon radical comprising a

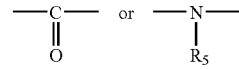

group
$R_5$ represents hydrogen or a hydrocarbon radical comprising from 1 to 6 carbon atoms,
$R_1$ is a linear or cyclic, aromatic or aliphatic, hydrocarbon radical which comprises at least two carbon atoms and which can comprise heteroatoms, n, m and p each represent a number between 50 and 500, preferably between 100 and 400.

The thermoplastic polymers used in the invention can comprise various additives, such as delustrants, heat stabilizers, light stabilizers, pigments, dyes or fillers, in particular abrasive fillers. Mention may in particular be made, by way of examples, of titanium oxide, zinc oxide, cerium oxide, silica or zinc sulphide, these being used as delustrant and/or abrasive.

According to another characteristic of the invention, the additive A is advantageously a polymer of the block, comb, hyperbranched or star type. Thus, the structure compatible with the thermoplastic material forms a block, the backbone or the teeth of the comb, or the core or the branches of the star polymer or of the hyperbranched polymer.

According to a preferred embodiment of the invention, the compatible structure of the additive A comprises functional groups chemically identical to those of the thermoplastic polymer P.

According to the preferred embodiment of the invention, the additive A is chosen from the group consisting of a polymer D defined below and a hyperbranched polymer E comprising at least one poly(alkylene oxide) block.

The said polymer D is a polymer possessing thermoplastic properties comprising a thermoplastic polymer block and at least one poly(alkylene oxide) block, such that:
  the thermoplastic polymer block comprises a star or H macromolecular chain comprising at least one polyfunctional core and at least one branch or one segment of thermoplastic polymer connected to the core, the core comprising at least three identical reactive functional groups,
  the poly(alkylene oxide) block or blocks are connected to at least a portion of the free ends of the star or H macromolecular chain chosen from the ends of branches or segments of thermoplastic polymer and the ends of the polyfunctional core.

Such thermoplastic polymers and their process of preparation are disclosed in particular in the document WO 03/002668, incorporated by reference.

The star macromolecular chain of the polymer D is advantageously a star polyamide obtained by copolymerization starting from a mixture of monomers comprising:
a) a polyfunctional compound comprising at least three identical reactive functional groups chosen from the amine functional group and the carboxylic acid functional group,
b) monomers of following general formulae (IIa) and/or (IIb):

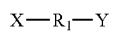 (IIa)

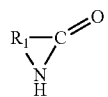 (IIb)

c) if appropriate, monomers of following general formula (III):

 (III)

in which:
  Z represents a functional group identical to that of the reactive functional groups of the polyfunctional compound,
  $R_1$ and $R_2$ represent identical or different, substituted or unsubstituted, aliphatic or cycloaliphatic or aromatic, hydrocarbon radicals which comprise from 2 to 20 carbon atoms and which can comprise heteroatoms,
  Y is a primary amine functional group when X represents a carboxylic acid functional group, or
  Y is a carboxylic acid functional group when X represents a primary amine functional group.

The H macromolecular chain of the thermoplastic polymer block of the polymer D is advantageously an H polyamide obtained by copolymerization starting from a mixture of monomers comprising:
a) a polyfunctional compound comprising at least three identical reactive functional groups chosen from the amine functional group and the carboxylic acid functional group,
b) lactams and/or amino acids,
c) a difunctional compound chosen from dicarboxylic acids or diamines,
d) a monofunctional compound, the functional group of which is either an amine functional group or a carboxylic acid functional group,
the functional groups of c) and d) being amine when the functional groups of a) are acid and the functional groups of c) and d) being acid when the functional groups of a) are amine, the ratio as equivalents of the functional groups of a) to the sum of the functional groups of c) and d) being between 1.5 and 0.66 and the ratio as equivalents of the functional groups of c) to the functional groups of d) being between 0.17 and 1.5.

The polyfunctional compound of the star or H macromolecular chains is advantageously represented by the formula (IV):

 (IV)

in which:
  $R_1$ is a linear or cyclic, aromatic or aliphatic, hydrocarbon radical which comprises at least two carbon atoms and which can comprise heteroatoms,
  A is a covalent bond or an aliphatic hydrocarbon radical comprising from 1 to 6 carbon atoms,
  Z represents a primary amine radical or a carboxylic acid radical,
  m is an integer between 3 and 8.

The polyfunctional compound is preferably chosen from 2,2,6,6-tetra(β-carboxyethyl)cyclohexanone, trimesic acid, 2,4,6-tri(aminocaproic acid)-1,3,5-triazine or 4-aminoethyl-1,8-octanediamine.

The poly(alkylene oxide) PAO block of the polymer D is preferably linear. It can be chosen from poly(ethylene oxide), poly(trimethylene oxide) or poly(tetramethylene oxide) blocks. In the case where the block is based on poly(ethylene oxide), it can comprise propylene glycol units at the ends of the block. The poly(alkylene oxide) block of the polymer D is preferably a poly(ethylene oxide) block.

Advantageously, all the free ends of the macromolecular chain of the thermoplastic polymer block of the polymer D are connected to a poly(alkylene oxide) block.

The term "hyperbranched polymer E" according to the invention is understood to mean a branched polymer structure which is obtained by polymerization in the presence of compounds having a functionality of greater than 2 and which has a structure which is not perfectly controlled. They are often random copolymers. Hyperbranched polymers can, for example, be obtained by reaction between, in particular, polyfunctional monomers, for example trifunctional and difunctional monomers, each of the monomers carrying at least two different reactive functional groups for polymerization.

Advantageously, the hyperbranched polymer E of the invention is chosen from hyperbranched polyesters, polyesteramides and polyamides.

The hyperbranched polymer E of the invention is preferably a hyperbranched copolyamide of the type of those obtained by reaction between:

at least one monomer of following formula (I):

$$A\text{-}R\text{—}B_f \qquad (I)$$

in which A is a reactive functional group for polymerization of a first type, B is a reactive functional group for polymerization of a second type capable of reacting with A, R is a hydrocarbon entity and f is the total number of B reactive functional groups per monomer: $f \geq 2$, preferably $2 \leq f \leq 10$;

at least one monomer of following formula (II):

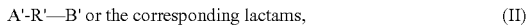
$$A'\text{-}R'\text{—}B' \text{ or the corresponding lactams,} \qquad (II)$$

in which A', B' and R' have the same definition as that given above respectively for A, B and R in the formula (I);

at least one "core" monomer of following formula (III) or at least one "chain-limiting" monomer of following formula (IV):

$$R^1(B'')_n \qquad (III)$$

in which:

$R^1$ is a substituted or unsubstituted hydrocarbon radical of the silicone, linear or branched alkyl, aromatic, alkylaryl, arylalkyl or cycloaliphatic type which can comprise unsaturations and/or heteroatoms;

B" is a reactive functional group of the same nature as B or B';

$n \geq 1$, preferably $1 \leq n \leq 100$;

$$R^2\text{-}A'' \qquad (IV)$$

in which:

$R_2$ is a substituted or unsubstituted hydrocarbon radical of the silicone, linear or branched alkyl, aromatic, arylalkyl, alkylaryl or cycloaliphatic type which can comprise one or more unsaturations and/or one or more heteroatoms;

and A" is a reactive functional group of the same nature as A or A';

the I/II molar ratio being defined as follows:

$0.05 < I/II$ and preferably $0.125 \leq I/II \leq 2$;

at least one of the R or R' entities of at least one of the monomers (I) or (II) being aliphatic, cycloaliphatic or arylaliphatic;

$R^1$ and/or $R^2$ being polyoxyalkylene radicals.

Such copolyamides are disclosed in the document WO 00/68298 A1, incorporated by reference, in particular on page 11, lines 3 to 6.

The reactive functional groups for polymerization A, B, A' and B' are advantageously chosen from the group consisting of carboxylic acid and amine functional groups.

The monomer of formula (I) of the hyperbranched copolyamide is advantageously a compound in which A represents the amine functional group, B represents the carboxylic acid functional group, R represents an aromatic radical and f=2.

$R^1$ and/or $R^2$ are advantageously aminated polyoxyalkylene radicals of Jeffamine® type.

The composition, in addition to the polymer P and the additive A, can comprise other compounds.

In one embodiment of the invention, the additive A is used in combination with a compound B which is insoluble in and incompatible with the thermoplastic material P. Advantageously, this compound B has a chemical structure compatible with at least a part of the structure of the compound A, in particular the part of the structure incompatible with the compound P. Mention may be made, as examples of compounds B which are suitable for the invention, of the compounds belonging to the families of the polysaccharides, poly(alkylene glycol)s and polyolefins. The compound B can be added separately from the compound A or in the form of a blend with at least a portion of the compound A.

It can also be preblended with the material P.

Any method known to a person skilled in the art for preparing a blend can be used to prepare the blend according to the invention. It is possible, for example, to carry out an intimate blending of granules of thermoplastic polymer P and of the additive A or a blending of granules of thermoplastic polymer P and of granules of the additive A. The thermoplastic polymer P can also be provided in the form of granules which are coated with the additive. The additive A can be introduced into the polymer P during the polymerization process, advantageously at the end of polymerization. It is also possible to introduce the additive A into the polymer in the molten state.

Stage a) consists in preparing the melt blend with stirring.

This stage is advantageously carried out in any mixing device compatible with the pressure and temperature conditions for processing the thermoplastic materials. Stage a) is preferably carried out in an extruder, more preferably still in a twin-screw or multi-screw extruder.

The blend can be prepared according to a method described above and can then be introduced into the extrusion device employed during stage a). The blend can be introduced in the solid or liquid form, for example in the molten state.

The blend can also be prepared in situ in the same extrusion device as that employed during stage a).

The stirring during stage a) makes possible shearing of the composition and efficient blending of the thermoplastic material and the additive A. The shear energy applied is determined according to the nature of the products to be blended and the size desired for the thermoplastic material particles.

The blend, before being cooled according to stage b), can be extruded through a die in order to be formed into a lace, strand or film in a conventional way known to a person skilled in the art.

Stage b) consists in cooling the blend in order to solidify at least the thermoplastic polymer. This cooling can be carried out conventionally using air or water.

The stage of disintegrating the thermoplastic polymer particles starting from the cooled blend can be carried out according to various processes.

Thus, a first process consists of the application of a mechanical force, such as rubbing, shearing or twisting, necessary to bring about this disintegration.

In another embodiment, the disintegration occurs instantaneously when the cooled blend is introduced into a liquid, such as water, for example.

In yet another embodiment, the liquid is advantageously a solvent for the additive A. Thus, it is possible to recover most of the additive A in order to be able, for example, to reuse it. Furthermore, the thermoplastic polymer powder will comprise a smaller amount of impurities or of additive A.

In another case, it may be advantageous not to remove the additive A, which will remain present at the surface of the thermoplastic material particles, thus modifying the surface properties of these particles.

Advantageously, stages b) and c) are carried out simultaneously. For example, the blend, after extrusion through a die, can be introduced directly into a reactor comprising a solvent for the additive A and a nonsolvent for the polymer P.

The particles of polymer P are optionally isolated from the solvent/additive A solution. The isolation can be carried out by any means which makes it possible to separate, from a liquid phase, a solid phase in suspension. Isolation can consist, for example, of a filtration, a separation by settling, a centrifuging or an atomization.

If, for example, an aqueous dispersion is concerned, the isolation can be carried out, for example, by atomization, in order to recover a powder comprising individual particles with a size equivalent to those present in the dispersion and/or aggregates of particles. These aggregates are generally easily redispersible in an aqueous medium, such as water, or are reduced by application of vibrations to the powder. Other means for removing water or recovering the powder can be used, such as filtration or centrifuging, then drying the filtration cake.

The particles of polymer P thus obtained can be washed and dried.

The process of the invention makes it possible to obtain particles of controlled geometry, in particular by adjusting the stirring during stage a), the nature of the compounds A and/or B, the temperature and the concentration of the various components of the blend.

One of the subject-matters of the invention is the thermoplastic material powders capable of being obtained by the process of the invention.

Advantageously, the particles obtained according to the process of the invention are spherical particles.

The term "spherical particle" is understood to mean a particle of essentially spherical shape.

Preferably, the mean diameter of these spherical particles is less than 100 μm.

The term "mean diameter" is understood to mean the value around which the distribution in the size of the particles is centred.

Advantageously, the particles obtained according to the process of the invention exhibit a mean diameter of less than or equal to 30 μm. Preferably, they exhibit a mean diameter of less than or equal to 10 μm, more preferably still of less than or equal to 5 μm, in particular of less than 1 μm, in particular of the order of 0.1 μm. The distribution in size of the particles is generally determined by laser particle sizing according to a method known to a person skilled in the art.

Other details or advantages of the invention will become more clearly apparent in the light of the examples given below and with reference to the appended FIGURE, in which a photograph of the dispersion obtained is represented.

EXAMPLE 1

The materials used are:
Polymer P: polyamide 6,6, with a relative viscosity of 2.6
Additive A: hydrophilic star polyamide-poly(alkylene oxide) copolymer prepared in the following way: 1116.0 g of ε-caprolactam (9.86 mol), 57.6 g of 1,3,5-benzenetricarboxylic acid (0.27 mol), 1826.4 g of Jeffamine® M2070 (0.82 mol), 1.9 g of Ultranox® 236 and 3.5 g of a 50% (w/w) aqueous hypophosphorous acid solution are introduced into a 7.5 liter autoclave equipped with a mechanical stirrer.

The reaction mixture is brought to 250° C. under nitrogen and at atmospheric pressure and is maintained at this temperature for 1 h. The system is then gradually placed under vacuum over 30 min down to a pressure of 5 mbar and then maintained under vacuum for an additional hour. The system is subsequently poured onto a plate.

The introduction is carried out, into a Prism 24D twin-screw extruder sold by Thermo Electron Corporation, of granules of polymer P, using feeding by volume, and of the additive A in the form of pellets, using feeding by weight. The throughputs of the two metering devices are adjusted so as to obtain a blend comprising 10% by weight of the additive A. The blend is extruded at a throughput of 1.66 kg/hour. The temperatures of the various zones of the extruder are between 265 and 295° C. The speed is set at 200 rpm. The pressure recorded is between 11 and 12 bar. The laces obtained are quenched at the die outlet with a stream of water, collected in a metal basket, drained and then dried.

The laces collected are subsequently dispersed in water by simple mechanical stirring. The dispersion thus obtained is sieved with a 200 μm sieve to remove the large solid impurities, such as nondispersible pieces of lace. The recovery efficiency by weight after sieving is greater than 97%. The particle size distribution of the particles present in the dispersion is measured using a MasterSizer 2000 device sold by Malvern Instruments. This distribution, expressed by volume, obtained after application of ultrasound, is unimodal and centred around a particle diameter of 0.750 μm. It is illustrated in the appended FIG. 1, in which a photograph of the dispersion obtained is represented.

The aqueous dispersion is subsequently dried in a ventilated oven in order to recover a polyamide powder comprising individual particles with a size equivalent to those present in the dispersion and/or aggregates of particles. These aggregates are easily redispersed in an aqueous medium, such as water, or reduced by application of ultrasound.

EXAMPLES 2-14

For these examples, the materials used are:
Polymer P: polyamide 6,6, with a relative viscosity of 2.6
Additive A: a hydrophilic star polyamide-poly(alkylene oxide) copolymer as described in Example 1.

The introduction is carried out, into a Prism 24D twin-screw extruder sold by Thermo Electron Corporation, of granules of polymer P, using feeding by volume, and of the additive A in the form of pellets, using feeding by weight. The throughputs for the two metering devices are adjusted so as to be able to vary the concentration of the additive A. The extrusion conditions (the throughput in kg/hour and the speed in rpm) for each blend are presented in Table I below. The temperatures of the various zones of the extrusion screw are between 260 and 300° C.

The laces obtained are quenched at the die outlet with a stream of water, collected in a metal basket, drained and then dried.

The laces collected are subsequently dispersed in water by simple mechanical stirring. The dispersion obtained is sieved and characterized according to the procedure described in Example 1 and the results are presented in Table I below.

TABLE I

| Example No. | Additive A (%) | Throughput (kg/h) | Speed (rpm) | Size (μm) |
|---|---|---|---|---|
| 2 | 10 | 2.28 | 150 | 1.10 |
| 3 | 10 | 2.42 | 500 | 0.83 |
| 4 | 12.5 | 2.06 | 150 | 1.10 |
| 5 | 12.5 | 1.98 | 450 | 0.83 |
| 6 | 15 | 1.92 | 200 | 0.96 |
| 7 | 15 | 2.1 | 500 | 0.96 |
| 8 | 17.5 | 1.82 | 150 | 1.44 |
| 9 | 17.5 | 1.86 | 450 | 0.96 |

TABLE I-continued

| Example No. | Additive A (%) | Throughput (kg/h) | Speed (rpm) | Size (µm) |
|---|---|---|---|---|
| 10 | 20 | 1.98 | 200 | 1.44 |
| 11 | 20 | 1.42 | 500 | 0.72 |
| 12 | 30 | 2.44 | 250 | 2.90 (broad) |
| 13 | 40 | 1.52 | 150 | 3.50 (broad) |
| 14 | 40 | 1.62 | 450 | 1.26 |

EXAMPLES 16-18

In these examples, the thermoplastic polymer P used is: Polymer P1: polyamide 6, relative viscosity of 2.7, or Polymer P2: polyamide 6, relative viscosity of 4.0 The additive A is identical to that used in the preceding examples.

The introduction is carried out, into a 24D twin-screw extruder of Prism type sold by Thermo Electron Corporation, of granules of polymer P (P1 or P2), using feeding by volume, and of the additive A in the form of pellets, using feeding by weight. The throughputs of the two metering devices are adjusted so as to be able to vary the amount of additive A in the blend (see Table II below). The blends are extruded at a throughput fixed between 1.9 and 2.2 kg/hour. The temperatures of the various zones of the extruder are between 245 and 280° C. The speed is fixed at 200 rpm. The pressure recorded is 11 bar. The laces obtained are quenched at the die outlet with a stream of water, collected in a metal basket, drained and then dried.

The laces collected are subsequently dispersed in water by simple mechanical stirring. The dispersion obtained is sieved and characterized according to the procedure described in Example 1. The recovery efficiencies by weight for the material charged are greater than 90%. The particle size distributions of the polyamide 6 particles in the dispersion are unimodal and the central diameter of the particles of each of the compositions is shown in the table below.

TABLE II

| Example No. | Polymer | Additive A (%) | Throughput (kg/h) | Size (µm) |
|---|---|---|---|---|
| 15 | P1 | 11 | 1.9 | 0.725 |
| 16 | P1 | 20 | 2.2 | 1.1 |
| 17 | P2 | 11 | 1.9 | 1.9 |
| 18 | P2 | 22.5 | 2.1 | 0.950 |

EXAMPLE 19

The preparation is carried out in a metal reactor with a capacity of 300 ml equipped with a mechanical stirrer of helical ribbon type, with a nitrogen inlet and with a distillation column at the outlet.

288.5 g of a 52% solution of nylon 6,6 salt in water (hexamethylenediamine adipate salt), i.e. 0.5717 mol of nylon salt, are introduced. The reactor is subsequently purged with nitrogen and then heated to 126° C. over 45 min, to concentrate the nylon salt to 70%. All the valves of the reactor are closed and the temperature is increased to 231° C. over 27 min. The pressure thus reaches 16.5 bar. The reactor is left at the pressure plateau for 48 min while the temperature increases to 250° C. The reaction mixture is subsequently decompressed over 36 min and the temperature is increased to 272° C. during this period.

32.35 g of the additive A, a hydrophilic star polyamide-poly(alkylene oxide) copolymer prepared as described in Example 1, are added in the solid form over a period of 5 min.

The reaction mixture is subsequently kept stirred at 272° C. for an additional 25 min.

The contents of the reactor are then run, under a slight excess nitrogen pressure, into 900 g of distilled water. A dispersion of polymer P particles is obtained by simple stirring. This dispersion is sieved and the particle size distribution is measured according to a procedure identical to that described in Example 1. The distribution of the dispersion is unimodal and the particle size peak is centred around 950 nm.

EXAMPLES 20-24

In these examples, the materials used are a thermoplastic polymer P composed of a polyamide 6,6 with a relative viscosity of 2.6 and an additive A which is one of the compounds below:

Additive: a hydrophilic star polyamide-poly(alkylene oxide) copolymer as described in Example 1.

Additive a2: a polyamide-poly(alkylene oxide) diblock copolymer prepared in the following way:

The following are introduced into a 500 ml reactor equipped with a mechanical stirrer:

73.3 g of ε-caprolactam (648 mmol), 7.9 g of benzoic acid (65 mmol), 138.8 g of Jeffamine® M2070 (65 mmol), 128 mg of Ultranox® 236 and 185 µl of a 50% (w/w) aqueous hypophosphorous acid solution.

The reaction mixture is brought to 160° C. under nitrogen and at atmospheric pressure and is maintained at this temperature for 3 hours. The reaction medium is then brought to 250° C. and is then maintained at this temperature for 1 h. The system is then gradually placed under vacuum, in order to reach a pressure of 5 mbar, and is then maintained under vacuum for an additional two hours. 195 g of polymer are collected at the end of the synthesis.

Additive A3: a polyamide-poly(alkylene oxide) triblock copolymer prepared in the following way:

The reaction is carried out in the same reactor and under the same temperature, stirring and pressure conditions as those employed for the additive A2.

83.6 g of ε-caprolactam (739 mmol), 4.5 g of adipic acid (31 mmol), 131.9 g of Jeffamine® M2070 (62 mmol), 143 mg of Ultranox® 236 and 208 µl of a 50% (w/w) aqueous hypophosphorous acid solution are introduced into the reactor.

166 g of polymer are collected at the end of the synthesis.

Additive a4: a polyamide-poly(alkylene oxide) triblock copolymer prepared in the following way:

The reaction is carried out in the same reactor and under the same temperature, stirring and pressure conditions as those employed for the additive A2.

83.3 g of ε-caprolactam (737 mmol), 5.1 g of terephthalic acid (31 mmol), 131.6 g of Jeffamine® M2070 (61 mmol), 143 mg of Ultranox® 236 and 207 µl of a 50% (w/w) aqueous hypophosphorous acid solution are introduced into the reactor.

192 g of polymer are collected at the end of the synthesis.

Additive a5: a polyamide-poly(alkylene oxide) triblock copolymer prepared in the following way:

The reaction is carried out in the same reactor and under the same temperature, stirring and pressure conditions as those employed for the additive A2.

121.1 g of ε-caprolactam (1072 mmol), 3.3 g of adipic acid (22 mmol), 95.6 g of Jeffamine® M2070 (45 mmol), 200 mg of Ultranox® 236 and 289 µl of a 50% (w/w) aqueous hypophosphorous acid solution are introduced into the reactor.

157 g of polymer are collected at the end of the synthesis.

10 g of an 80/20 blend of granules of polymer P (80% by weight) and of the additive under consideration (20% by weight) (see Table III below) are introduced into a conical twin-screw mini-extruder equipped with a recirculation channel sold by DSM Xplore under the reference: 15 ml Twinscrew Compounder. The mixing time, the temperature and the speed of the screw are respectively set at:

t=4 minutes
T=275° C.
S=100 rpm.

The laces obtained are quenched at the die outlet in a water bath, collected, drained and then dried.

The laces collected are subsequently milled in a mill sold by Retsch under the reference ZM 1000 (2 mm screen). These milled laces are subsequently dispersed in water by simple mechanical stirring. Each of the dispersions obtained is subsequently subjected to ultrasound using a probe sold by Bioblock Scientific under the reference VibraCell 72412. Each dispersion is subsequently sieved with a 200 μm sieve to remove large solid impurities, such as nondispersible pieces of lace. The recovery efficiency by weight for thermoplastic polymer P after sieving for each of the dispersions is shown in Table III below. The particle size distribution of the particles present in each dispersion is measured using a device known as a MasterSizer 2000 sold by Malvern Instruments. This distribution, expressed by volume, is unimodal and the particle size modal peak, expressed as particle diameter, is also shown in Table III below.

TABLE III

| Example No. | Additive | Size (μm) | Efficiency (%) |
|---|---|---|---|
| 20 | A | 0.68 μm | 97 |
| 21 | A2 | 1.30 μm | 81 |
| 22 | A3 | 2.00 μm | 93 |
| 23 | A4 | 0.93 μm | 93 |
| 24 | A5 | 0.48 μm | 94 |

EXAMPLES 25-30

In these examples, the materials used are a thermoplastic polymer P composed of one of the polymers shown below:

P1: polyamide 6, with a relative viscosity of 2.7.

P3: a polymer obtained by addition of 1.3% by weight (1 mol %) of adipic acid to the polycondensation of caprolactam. The polycondensation process is that of a standard polyamide 6. The polymer obtained exhibits an IV of 67 ml/g.

P4: a star polyamide obtained by copolymerization starting from caprolactam in the presence of approximately 0.5 mol % of 2,2,6,6-tetra(β-carboxyethyl)cyclohexanone, according to a process disclosed in the document FR 2 743 077.

and an additive which is one of the compounds below:

Additive A: a hydrophilic star polyamide-poly(alkylene oxide) copolymer as described in Example 1.

Additive A6: a triblock copolymer: poly(ethylene oxide)-block-poly(propylene oxide)-block-poly(ethylene oxide); CAS No.: 9003-11-6; product sold by Aldrich (Reference No. 412325, mass Mn ~14 600 g/mol; PEG 82.5% by weight).

10 g of a blend of granules of polymer P and of the additive under consideration (the compositions are shown in Table IV below) are introduced into a conical twin-screw mini-extruder equipped with a recirculation channel sold by DSM Xplore under the reference: 15 ml Twinscrew Compounder. The mixing time, the temperature and the speed of the screws are respectively set at:

t=4 minutes,
T=250° C.,
S=100 rpm.

The laces obtained are quenched at the die outlet in a water bath, collected, drained and then dried.

The laces collected are subsequently treated as in the preceding Examples Nos. 20 to 24. The results with regard to efficiencies by weight and size are shown in Table IV below.

TABLE IV

| Example No. | Polymer P | Polymer P (% by weight) | Additive | Additive (% by weight) | Size (μm) | Efficiency (%) |
|---|---|---|---|---|---|---|
| 25 | P1 | 80 | A | 20 | 0.48 | 93 |
| 26 | P1 | 60 | A6 | 40 | 140.00 | 53 |
| 27 | P3 | 80 | A | 20 | 0.37 | 97 |
| 28 | P3 | 60 | A6 | 40 | 12.00 (broad) | 96 |
| 29 | P4 | 80 | A | 20 | 0.34 | 98 |
| 30 | P4 | 60 | A6 | 40 | 35.00 (broad) | 93 |

EXAMPLES 31-33

In these examples, the materials used are a thermoplastic polymer P composed of one of the polymers shown below:

P5: polyamide 6,12 sold by Degussa under the reference PA6-12 Vestamid D16®,

P6: polypropylene sold by Atofina under the reference PPH 7059®,

P7: polyester sold by VIPO-Polymer NK under the reference 74A40 PC 95®, and an additive A, the hydrophilic star polyamide-poly(alkylene oxide) copolymer as described in Example 1.

10 g of a blend of granules of polymer P and of the additive A under consideration (the compositions are shown in Table V below) are introduced into a conical twin-screw mini-extruder equipped with a recirculation channel sold by DSM Xplore under the reference: 15 ml Twinscrew Compounder. The mixing time and the speed of the screws are respectively set at:

t=4 minutes,
S=100 rpm.

The mixing temperature for each additive-polymer pair is shown in Table V below.

The laces obtained are quenched at the die outlet in a water bath, collected, drained and then dried.

The laces collected are subsequently treated as in the preceding Examples Nos. 20 to 24. The results with regard to efficiencies by weight and size are shown in Table V below.

TABLE V

| Example No. | Polymer P | Additive A (% by weight) | Temperature (° C.) | Size (μm) | Efficiency (%) |
|---|---|---|---|---|---|
| 31 | P5 | 40 | 250 | 17.00 | 97 |
| 32 | P6 | 40 | 230 | 25.00 | 76 |
| 33 | P7 | 40 | 275 | 75.00 | 62 |

EXAMPLE 34

In this example, the materials used are a polymer P1, polyamide 6 with a relative viscosity of 2.7, and an additive A7 which is an alkyl-terminated hyperbranched polyamide copolymer according to Example 2 of Patent Application WO 03/051993.

10 g of a blend composed of 60% by weight of granules of polyamide 6 and of 40% by weight of the additive A7 are introduced into a conical twin-screw mini-extruder equipped with a recirculation channel sold by DSM Xplore under the reference: 15 ml Twinscrew Compounder. The mixing time, the temperature and the speed of the screws are respectively set at:

t=4 minutes,
T=250° C.,
S=100 rpm.

The laces obtained are quenched at the die outlet in a water bath, collected, drained and then dried.

The laces collected are subsequently dispersed in cyclohexane with magnetic stirring. Observations under an optical microscope show the presence of spherical powders formed of polyamide 6 with a size of 1 to 25 μm.

EXAMPLES 35-37

In these examples, the materials used are a thermoplastic polymer P composed of one of the polymers shown below:

P1: polyamide 6, with a relative viscosity of 2.7,
P7: polyester sold by VIPO-Polymer NK under the reference 74A40 PC 95, and an additive A8, the polyethylene glycol-polyester copolymer sold by Rhodia under the reference Repel-O-Tex SRP6®.

10 g of a blend of granules of polymer P and of the additive A8 under consideration (the compositions are shown in Table VI below) are introduced into a conical twin-screw mini-extruder equipped with a recirculation channel sold by DSM Xplore under the reference: 15 ml Twinscrew Compounder. The mixing time and the speed of the screws are respectively set at:

t=4 minutes
S=100 rpm.

The mixing temperature for each additive-polymer pair is shown in Table VI below.

The laces obtained are quenched at the die outlet in a water bath, collected, drained and then dried.

The laces collected are subsequently treated as in the preceding Examples Nos. 20 to 24. The results with regard to efficiencies by weight and size are shown in Table VI below.

TABLE VI

| Example No. | Polymer P | Additive A8 (% by weight) | Temperature (° C.) | Size (μm) | Efficiency (%) |
|---|---|---|---|---|---|
| 35 | P1 | 40 | 250 | 155 | 42 |
| 36 | P7 | 20 | 275 | 145 | 43 |
| 37 | P7 | 40 | 275 | 115 | 63 |

The invention claimed is:

1. A process for the manufacture of a powder made of thermoplastic material P and comprising particles with a mean diameter of less than 1 mm, said process comprising the steps of:
   a. obtaining a dispersion of discrete particles of the thermoplastic material P by forming a melt blend of said thermoplastic material P with an additive A, said additive A being formed by a polymeric material comprising at least a part of its structure compatible with said thermoplastic material P and at least a part of its structure incompatible with and insoluble in said thermoplastic material P;
   b. cooling said blend to a temperature below the softening temperature of the thermoplastic material P; and
   c. treating said cooled blend in order to bring about the disintegration of the discrete particles of thermoplastic material P,
   wherein the concentration by weight of additive A in the blend is between 1% and 50%, and
   wherein the additive A is a block copolymer D comprising a thermoplastic polymer block and at least one poly(alkylene oxide) block, such that:
   the thermoplastic polymer block comprises a star or H macromolecular chain comprising at least one polyfunctional core and at least one branch or one segment of thermoplastic polymer connected to the core, the core comprising at least three identical reactive functional groups, and
   the poly(alkylene oxide) block or blocks are connected to at least a portion of the free ends of the star or H macromolecular chain chosen from the ends of branches or segments of thermoplastic polymer and the ends of the polyfunctional core.

2. The process according to claim 1, wherein the blend is formed by melting the thermoplastic material P and adding the additive A in the solid or molten form and applying mixing energy, in order to bring about the formation of the discrete particles of thermoplastic material.

3. The process according to claim 1, wherein the blend is formed by blending, in the solid state, particles of said thermoplastic material P and particles of said additive A and melting the blend of particles with application to the melt blend of mixing energy, in order to bring about the formation of discrete particles of thermoplastic material.

4. The process according to claim 1, wherein the concentration by weight of additive A in the blend is between 3% and 30%.

5. The process according to claim 1, wherein the forming process is a process of extrusion through a die.

6. The process according to claim 1, wherein the melt blend is prepared in an extruder feeding an extrusion die.

7. The process according to claim 1, wherein the cooling is an air cooling.

8. The process according to claim 1, wherein the cooling is obtained by quenching in a liquid.

9. The process according to claim 1, wherein the treatment for disintegration of the particles made of thermoplastic material P is brought about by application of a shear force to the cooled blend.

10. The process according to claim 1, wherein the treatment for disintegration of the particles made of thermoplastic material P is brought about by quenching the cooled melt blend in a liquid which is not a solvent for the thermoplastic material P.

11. The process according to claim 10, wherein the liquid is a solvent for the additive A.

12. The process according to claim 1, wherein the particles forming the thermoplastic material P powder have a polyhedral shape.

13. The process according to claim 1, wherein the thermoplastic polymer is a polyamide or a polyester.

14. The process according to claim 13, wherein the thermoplastic polymer is polyamide 6, polyamide 6,6, polyamide 11, polyamide 12, polyamide 4,6, poly-amide 6,10, polyamide 6,12, polyamide 12,12, polyamide 6,36, their copolymers or their alloys.

15. The process according to claim 1, wherein the thermoplastic polymer further comprises an additive which is a delustrant, heat light stabilizer, heat stabilizer, pigment, dye, filler, or abrasive filler.

16. The process according to claim 1, wherein the H macromolecular chain is required for the thermoplastic polymer block of the polymer D and is an H polyamide obtained by copolymerization starting from a mixture of monomers comprising:
   a) a polyfunctional compound comprising at least three identical reactive functional groups chosen from an amine functional group or a carboxylic acid functional group,
   b) lactams and/or amino acids,
   c) a difunctional compound chosen from a dicarboxylic acid or a diamine, and
   d) a monofunctional compound, the functional group of which is either an amine functional group or a carboxylic acid functional group,
   wherein the functional groups of c) and d) are an amine when the functional groups of a) are an acid,
   wherein the functional groups of c) and d) are an acid when the functional groups of a) are amine,
   wherein the ratio as equivalents of the functional groups of a) to the sum of the functional groups of c) and d) is between 1.5 and 0.66, and
   wherein the ratio as equivalents of the functional groups of c) to the functional groups of d) is between 0.17 and 1.5.

17. The process according to claim 16, wherein the polyfunctional compound is represented by the following formula (IV):

$$R_1\text{-}[\text{-}A\text{-}Z]_m \quad (IV)$$

in which:

$R_1$ is a linear or cyclic, aliphatic or aromatic hydrocarbon radical having at least two carbon atoms and optionally having heteroatoms, A is a covalent bond or an aliphatic hydrocarbon radical having from 1 to 6 carbon atoms, Z represents a primary amine radical or a carboxylic acid radical, and m is an integer between 3 and 8.

18. The process according to claim 16, wherein the polyfunctional compound is 2,2,6,6-tetra(β-carboxyethyl)cyclohexanone, trimesic acid, 2,4,6-tri(aminocaproic acid)-1,3,5-triazine or 4-aminoethyl-1,8-octanediamine.

19. The process according to one of claim 1, wherein the poly(alkylene oxide) block of the polymer D is linear.

20. The process according to claim 19, wherein the poly(alkylene oxide) block of the polymer D is a poly(ethylene oxide) block.

21. The process according to claim 1, wherein the free ends of the macromolecular chain of the thermoplastic polymer block of the polymer D are connected to a poly(alkylene oxide) block.

22. The process according to claim 1, wherein the blend further comprises a compound B which is insoluble in and incompatible with the thermoplastic material P.

23. The process according to claim 22, wherein the compound B has a structure compatible with at least a part of the structure of the compound A.

24. The process according to claim 22, wherein the compound B is a polysaccharide, poly(alkylene glycol) or polyolefin.

25. The process according to claim 1, wherein the particles have mean diameter of less than 1 μm.

26. The process according to claim 1, wherein the particles have mean diameter of less than 0.1 μm.

* * * * *

UNITED STATES PATENT AND TRADEMARK OFFICE
CERTIFICATE OF CORRECTION

PATENT NO. : 8,454,866 B2
APPLICATION NO. : 11/664915
DATED : June 4, 2013
INVENTOR(S) : Pascal Herve et al.

Page 1 of 1

It is certified that error appears in the above-identified patent and that said Letters Patent is hereby corrected as shown below:

On the Title Page, Item [75] Inventors, please correct:

Pascal Herve, "Lyons (FR)" should read Pascal Herve, -- Lyon (FR) --;
Christophe Paulo, "Lyons (FR)" should read Christophe Paulo, -- Lyon (FR) --;
and "Mare Labeille" should read -- Marc Labeille --.

Signed and Sealed this
Sixth Day of August, 2013

Teresa Stanek Rea
*Acting Director of the United States Patent and Trademark Office*